United States Patent
Kurosaki

(10) Patent No.: US 9,695,310 B2
(45) Date of Patent: Jul. 4, 2017

(54) FLUORORESIN COMPOSITION

(71) Applicant: Junkosha, Inc., Ibaraki (JP)

(72) Inventor: Kenji Kurosaki, Ibaraki (JP)

(73) Assignee: Junkosha, Inc., Ibaraki (JP)

( * ) Notice: Subject to any disclaimer, the term of this patent is extended or adjusted under 35 U.S.C. 154(b) by 143 days.

(21) Appl. No.: 14/395,685

(22) PCT Filed: Apr. 19, 2013

(86) PCT No.: PCT/JP2013/061650
§ 371 (c)(1),
(2) Date: Oct. 20, 2014

(87) PCT Pub. No.: WO2013/161708
PCT Pub. Date: Oct. 31, 2013

(65) Prior Publication Data
US 2015/0080506 A1    Mar. 19, 2015

(30) Foreign Application Priority Data

Apr. 25, 2012  (JP) ................. 2012-100007

(51) Int. Cl.
C08L 29/10 (2006.01)
C08L 27/18 (2006.01)
C08K 5/3445 (2006.01)
C08K 5/43 (2006.01)

(52) U.S. Cl.
CPC .............. C08L 29/10 (2013.01); C08L 27/18 (2013.01); *C08K 5/3445* (2013.01); *C08K 5/43* (2013.01); *C08L 2205/02* (2013.01); *C08L 2205/025* (2013.01); *C08L 2205/03* (2013.01)

(58) Field of Classification Search
CPC ........... C08L 2205/03; C08L 2205/025; C08L 27/16–27/20
See application file for complete search history.

(56) References Cited

FOREIGN PATENT DOCUMENTS

JP    2011032359 A  *  2/2011

OTHER PUBLICATIONS

Machine translation of JP 2011032359 A, 2011.*

* cited by examiner

*Primary Examiner* — Wenwen Cai

(57) ABSTRACT

Provided are a fluororesin composition having a low electrostatic propensity, and a fluororesin molded article having a low electrostatic propensity that is configured from a fluororesin composition. A thermoplastic fluororesin composition that comprises a fluororesin, two or more kinds of vinylidene fluoride-tetrafluoroethylene-hexafluoropropylene terpolymers and an ionic liquid, wherein said terpolymers include a terpolymer selected from among terpolymers containing 30-45 mol % of vinylidene fluoride and a terpolymer selected from among terpolymers containing 5-25 mol % of vinylidene fluoride; and a fluororesin molded article.

5 Claims, No Drawings

FLUORORESIN COMPOSITION

CROSS-REFERENCE TO RELATED APPLICATIONS

This application is the national stage entry of PCT/JP2013/061650, filed on Apr. 19, 2013, which claims priority to Japanese Patent Application Number JP2012-100007, filed on Apr. 25, 2012, both of which are incorporated herein by reference in their entireties.

TECHNICAL FIELD

The present invention relates to a fluororesin composition having a low electrostatic propensity, and particularly relates to a thermoplastic fluororesin composition and a fluororesin molded article using the same.

BACKGROUND

A fluororesin is a material having a high electrostatic propensity and surface resistance. When a film of a fluororesin composition is used as a bag-shaped packaging member, the film adheres due to the triboelectrification and difficulties in peeling off the film may occur either within the packaging members or between the packaging member and the packaged member.

Moreover, when a thin-walled tube of a fluororesin composition is used as a roll cover for a heat fixing unit roll in photocopiers and printers, there has been a problem that papers often cannot be released from the roll due to the triboelectrification between the roll cover and the papers. Furthermore, when a semiconductor device is installed with members manufactured by a fluororesin composition, there has been a problem that the semiconductor device may be destroyed depending upon its charging potential.

In order to improve electrostatic characteristics of a fluororesin composition, conductive particles such as carbon black or the like have been added. However, it makes a fluororesin composition to be colored, which leads a problem that contents become invisible. In order to solve this problem, the present applicant has proposed adding an elastomer having a vinylidene fluoride structure and further an ionic liquid to a thermoplastic fluororesin composition (for example, see Patent Document 1).

PRIOR ART DOCUMENT

Patent Document

Patent Document 1: Japanese Patent Publication No. 2011-32359

SUMMARY OF THE INVENTION

Problems to be Solved by the Invention

It is an object of the present invention to provide a fluororesin composition that maintains insulation properties possessed by a fluororesin, has a low electrostatic propensity, and attenuates electrified charges more rapidly.

Means for Solving the Problems

The present invention is a thermoplastic fluororesin composition comprising a fluororesin, two kinds of vinylidene fluoride-tetrafluoroethylene-hexafluoropropylene terpolymers and an ionic liquid, and the terpolymers are selected from terpolymers containing 30-45 mol % of vinylidene fluoride and terpolymers containing 5-25 mol % of vinylidene fluoride.

Further, in the above fluororesin composition, the fluororesin is tetrafluoroethylene-perfluoroalkylvinylether copolymer or tetrafluoroethylene.hexafluoropropylene copolymer.

Further, in the above fluororesin composition, the terpolymer containing 30-45 mol % of vinylidene fluoride and the terpolymer containing 5-25 mol % of vinylidene fluoride are contained in a total amount of 0.05% by mass to 10% by mass in the fluororesin composition.

Further, in the above fluororesin composition, the ionic liquid has a heterocyclic ring.

In the above fluororesin composition, the ionic liquid is contained in the amount of 0.01% by mass to 1% by mass in the fluororesin composition.

The present invention is also a molded article using the above fluororesin composition.

Effects of the Invention

The fluororesin composition of the present invention adds two kinds of a plurality of terpolymers having a vinylidene fluoride structure with different amounts of vinylidene fluoride and an ionic liquid to the fluororesin. It is considered that a large dipole moment of vinylidene fluoride constituting the terpolymers which is added to the fluororesin composition makes it possible to form a path to move an ionic liquid, and thereby charge attenuation properties can be expressed. As a result, it is possible to reduce an electrostatic propensity of a fluororesin composition without adding conductive particles or the like. Therefore, the fluororesin composition of the present invention can be available in applications where members having a low electrostatic propensity are required. It is also possible to provide a fluororesin composition having high corrosion resistance and high transparency, and fluororesin-manufactured members which are prepared using the same.

MODES FOR CARRYING OUT THE INVENTION

The present invention discovered that a fluororesin composition having a low electrostatic propensity can be provided without adding a conductive filler by comprising a fluororesin, a plurality of vinylidene fluoride-tetrafluoroethylene-hexafluoropropylene terpolymers, and an ionic liquid, and adding as the terpolymers both of a terpolymer containing 30-45 mol % of vinylidene fluoride and a terpolymer containing 5-25 mol % of vinylidene fluoride, respectively.

The reason why this fluororesin composition having a low electrostatic propensity is obtained is not clear. However, it is considered that the terpolymer containing a larger amount of vinylidene fluoride has a good affinity with the ionic liquid whereas the terpolymer containing a smaller amount of vinylidene fluoride has good dispersion properties in the fluororesin, thereby drawing a synergistic effect of both. As a result, excellent charge attenuation properties are expressed compared to each case in which either one is added alone, and the fluororesin composition having a low electrostatic propensity is formed.

A fluororesin has excellent chemical resistance and other properties compared to other synthetic resins, and fluororesins are widely used in fields where chemical resistance is required, or where the absence of problems such as liquid contamination due to the elution from plastics is required.

The fluororesin composition of the present invention can provide a fluororesin composition having a low electrostatic propensity as well as good electric insulation properties, without adding conductive particles such as carbon black, metal compounds, or the like to the fluororesin composition.

It is also possible to provide a fluororesin composition which removes electricity immediately when electrified by corona discharges or friction or the like.

As polymers having vinylidene fluoride, a homopolymer of vinylidene fluoride (PVDF), a copolymer of vinylidene fluoride and hexafluoropropylene, tetrachloroethylene-hexafluoropropylene-vinylidene fluoride terpolymer and the like have been known. Since PVDF or general copolymers contain a large amount of vinylidene fluoride structures which possess high polarity, they exhibit a strong interaction with an ionic liquid. However, they have extremely poor dispersion properties in perfluoropolymers, which leads to a problem that charge attenuation properties as a resin composition become worse adversely. For this reason, in the present invention, it is advantageous to use terpolymers which enable the interaction with an ionic liquid and dispersion properties in perfluoropolymers to be compatible.

Examples of terpolymers having a vinylidene fluoride structure which can be used in the present invention may include vinylidenefluoride/hexafluoropropylene/tetrafluoroethylene terpolymer, for example, $-(CH_2CF_2)_l-(CF_2CF(CF_3))_m-(CF_2CF_2)_n-$, vinylidenefluoride/perfluoromethylvinylether/tetrafluoroethylene terpolymer, for example, $-(CH_2CF_2)_l-(CF_2CF(OCF_3))_m-(CF_2CF_2)_n-$.

Specific examples of the terpolymers containing 30-45 mol % of vinylidene fluoride may include Dyneon THV221AZ (manufactured by 3M-Sumitomo Co., Ltd.) which contains 40 mol % of vinylidene fluoride and likewise, DAI-EL G902 (manufactured by Daikin Industries, Ltd.) which contains 33 mol % of vinylidene fluoride.

In addition, specific examples of the terpolymers containing 5-25 mol % of vinylidene fluoride may include Dyneon THV610GZ (manufactured by 3M-Sumitomo Co., Ltd.) which contains mol % of vinylidene fluoride and likewise, Dyneon THV815GZ (manufactured by 3M-Sumitomo Co., Ltd.) which contains 10 mol % of vinylidene fluoride. In the present invention, the ratio of vinylidene fluoride is a value calculated by 19F-NMR method.

The total amount of the two kinds of terpolymers having a vinylidene fluoride structure is, preferably 0.05% by mass or more and 10% by mass or less, more preferably 0.1% by mass or more and 10% by mass or less, and even more preferably 0.3% by mass or more and 5% by mass or less.

When the amount of the terpolymers is less than 0.05% by mass, a low electrostatic propensity cannot be obtained, and when it is more than 10% by mass, heat resistance, workability, mechanical strength, and other properties are lowered.

By adjusting the amount of the terpolymer having a vinylidene fluoride structure containing 30-45 mol % of vinylidene fluoride and the terpolymer having a vinylidene fluoride structure containing 5-25 mol % of vinylidene fluoride in the range of 20/80 to 80/20, by mass ratio, a good affinity with an ionic liquid and good dispersion properties in a thermoplastic fluororesin can be obtained and it is considered that the synergistic effect can be obtained by adding these two kinds of the terpolymers.

Examples of the ionic liquid added to the fluororesin composition of the present invention may include 1-ethyl-3-methylimidazolium-bis(trifluoromethylsulfonyl)imide (EMI-TFSI), 1-ethyl-3-methylimidazolium-bis(perfluorobutylsulfonyl)imide (EMI-PFBSI), 1-butyl-3-methylimidazolium-bis(trifluoromethylsulfonyl)imide, 1-hexyl-3-methylimidazolium-bis(trifluoromethylsulfonyl)imide, 1-ethyl-3-methylimidazolium-perfluorobutylsulfonate, 1-ethyl-3-methylimidazolium-perfluoroethylsulfonate, 1-ethyl-3-methylimidazolium-cyclohexafluoropropane-1,3-bis(sulfonyl)imide and the like.

The amount of these ionic liquid is preferably 0.01% by mass or more and 1% by mass or less, relative to the fluororesin composition.

When the amount of the ionic liquid is less than 0.01% by mass, an electrostatic propensity is not lowered, and when it is more than 1% by mass, there is a possibility that bleed-out may occur from the fluororesin composition.

Examples of the fluororesin which can be used in the fluororesin composition of the present invention may include at least one selected from tetrafluoroethylene-fluoroalkylvinylether copolymer (PFA), tetrafluoroethylene-hexafluoropropylene copolymer (FEP), ethylene-tetrafluoroethylene copolymer (ETFE), polychlorotrifluoroethylene (PCTFE), and ethylene-chlorotrifluoroethylene copolymer (ECTFE). Among these, tetrafluoroethylene-fluoroalkylvinylether copolymer (PFA) and tetrafluoroethylene-hexafluoropropylene copolymer (FEP) are preferable.

Further, as a fluororesin, a fluororesin whose terminal groups are stabilized by treating the fluororesin obtained by polymerization with a fluorinating agent can be used or a fluororesin whose terminal groups are not stabilized can be used together with the terminal group stabilized fluororesin.

The fluororesin composition of the present invention can be molded into the desired shape by extrusion molding, roller molding, injection molding, or other methods, after the fluororesin is mixed with the elastomer having a vinylidene fluoride structure in the desired ratio.

The present invention is illustrated below by referring to Examples and Comparative Examples.

EXAMPLES

Example 1

Dyneon THV221AZ (manufactured by 3M-Sumitomo Co., Ltd.) 0.4 parts by mass, Dyneon THV610GZ (manufactured by 3M-Sumitomo Co., Ltd.) 0.4 parts by mass, and 1-ethyl-3-methylimidazolium-bis(trifluoromethylsulfonyl) imide 0.16 parts by mass, relative to fluororesin: tetrafluoroethylene-fluoroalkylvinylether copolymer (PFA: PFA451HP-J manufactured by Du Pont-Mitsui Fluorochemicals Co., Ltd.) 79.04 parts by mass were inserted to a roller mixer-type kneading machine (Labo-plastomill model 30C150 manufactured by Toyo Seiki Seisaku-Sho, Ltd.). After mixing the composition for 20 minutes at a roller rotation speed of 20 rpm and a temperature of 340° C., the product was collected from the kneading machine, and 40 mm×40 mm sample with a thickness of 0.05 mm was prepared using a heat press at a temperature of 340° C.

Measurement of Attenuation of Charging Voltage

The maximum charging voltage and the half-life were measured using a half-life measurement device (Static Honest Meter H-0110 manufactured by Shishido Electrostatic, Ltd.) by applying −10 kV of voltage onto the prepared sample at a distance of 20 mm from the upper surface of the sample. The measurement results are shown in Table 1.

Example 2

The preparation of the sample and the measurement of charge attenuation were carried out in the same manner as in Example 1, except that Dyneon THV221AZ used in Example 1 was replaced with DAI-EL G902 (manufactured by Daikin Industries, Ltd.) and THV610GZ was also changed to Dyneon THV815GZ (manufactured by 3M-Sumitomo Co., Ltd.). The measurement results are shown in Table 1.

Example 3

The preparation of the sample and the measurement of charge attenuation were carried out in the same manner as in Example 1, except that THV610GZ used in Example 1 was changed to Dyneon THV815GZ. The measurement results are shown in Table 1.

Example 4

The preparation of the sample and the measurement of charge attenuation were carried out in the same manner as in Example 1, except that Dyneon THV221AZ (manufactured by 3M-Sumitomo Co., Ltd.) used in Example 1 was changed to DAI-EL G902 (manufactured by Daikin Industries, Ltd.). The measurement results are shown in Table 1.

Example 5

The preparation of the sample and the measurement of charge attenuation were carried out in the same manner as in Example 1, except that the amount of Dyneon THV221AZ (manufactured by 3M-Sumitomo Co., Ltd.) used in Example 1 was changed to 0.27 parts by mass and the amount of Dyneon THV610GZ (manufactured by 3M-Sumitomo Co., Ltd.) was changed to 0.53 parts by mass. The measurement results are shown in Table 1.

Example 6

The preparation of the sample and the measurement of charge attenuation were carried out in the same manner as in Example 1, except that the amount of Dyneon THV221AZ (manufactured by 3M-Sumitomo Co., Ltd.) used in Example 1 was changed to 0.53 parts by mass and the amount of Dyneon THV610GZ (manufactured by 3M-Sumitomo Co., Ltd.) was changed to 0.27 parts by mass. The measurement results are shown in Table 1.

Example 7

The preparation of the sample and the measurement of charge attenuation were carried out in the same manner as in Example 1, except that Dyneon THV221AZ (manufactured by 3M-Sumitomo Co., Ltd.) 0.04 parts by mass, Dyneon THV610GZ (manufactured by 3M-Sumitomo Co., Ltd.) 0.04 parts by mass, and 1-ethyl-3-methylimidazolium-bis(trifluoromethylsulfonyl)imide 0.16 parts by mass, relative to fluororesin: tetrafluoroethylene-fluoroalkylvinylether copolymer (PFA: PFA451HP-J manufactured by Du Pont-Mitsui Fluorochemicals Co., Ltd.) 71.84 parts by mass were used. The measurement results are shown in Table 1.

Example 8

The preparation of the sample and the measurement of charge attenuation were carried out in the same manner as in Example 1, except that Dyneon THV221AZ (manufactured by 3M-Sumitomo Co., Ltd.) 0.02 parts by mass, Dyneon THV610GZ (manufactured by 3M-Sumitomo Co., Ltd.) 0.02 parts by mass, and 1-ethyl-3-methylimidazolium-bis(trifluoromethylsulfonyl)imide 0.16 parts by mass, relative to fluororesin: tetrafluoroethylene-fluoroalkylvinylether copolymer (PFA: PFA451HP-J manufactured by Du Pont-Mitsui Fluorochemicals Co., Ltd.) 79.8 parts by mass were used. The measurement results are shown in Table 1.

Example 9

The preparation of the sample and the measurement of charge attenuation were carried out in the same manner as in Example 1, except that Dyneon THV221AZ (manufactured by 3M-Sumitomo Co., Ltd.) 4 parts by mass, Dyneon THV610GZ (manufactured by 3M-Sumitomo Co., Ltd.) 4 parts by mass, and 1-ethyl-3-methylimidazolium-bis(trifluoromethylsulfonyl)imide parts by mass, relative to fluororesin: tetrafluoroethylene-fluoroalkylvinylether copolymer (PFA: PFA451HP-J manufactured by Du Pont-Mitsui Fluorochemicals Co., Ltd.) 79.76 parts by mass were used. The measurement results are shown in Table 1.

Example 10

The preparation of the sample and the measurement of charge attenuation were carried out in the same manner as in Example 1, except that Dyneon THV221AZ (manufactured by 3M-Sumitomo Co., Ltd.) 0.4 parts by mass, Dyneon THV610GZ (manufactured by 3M-Sumitomo Co., Ltd.) 0.4 parts by mass, and 1-ethyl-3-methylimidazolium-bis(trifluoromethylsulfonyl)imide 0.04 parts by mass, relative to fluororesin: tetrafluoroethylene-fluoroalkylvinylether copolymer (PFA: PFA451HP-J manufactured by Du Pont-Mitsui Fluorochemicals Co., Ltd.) 76.76 parts by mass were used. The measurement results are shown in Table 1.

Example 11

The preparation of the sample and the measurement of charge attenuation were carried out in the same manner as in Example 1, except that Dyneon THV221AZ (manufactured by 3M-Sumitomo Co., Ltd.) 0.4 parts by mass, Dyneon THV610GZ (manufactured by 3M-Sumitomo Co., Ltd.) 0.4 parts by mass, and 1-ethyl-3-methylimidazolium-bis(trifluoromethylsulfonyl)imide 0.8 parts by mass, relative to fluororesin: tetrafluoroethylene-fluoroalkylvinylether copolymer (PFA: PFA451HP-J manufactured by Du Pont-Mitsui Fluorochemicals Co., Ltd.) 78.4 parts by mass were used. The measurement results are shown in Table 1.

Example 12

The preparation of the sample and the measurement of charge attenuation were carried out in the same manner as in Example 1, except that 1-ethyl-3-methylimidazolium-bis(trifluoromethylsulfonyl)imide used in Example 1 was changed to 1-ethyl-3-methylimidazolium-bis(perfluorobutylsulfonyl)imide. The measurement results are shown in Table 1.

Example 13

The preparation of the sample and the measurement of charge attenuation were carried out in the same manner as in Example 1, except that fluororesin used in Example 1: tetrafluoroethylene-fluoroalkylvinylether copolymer (PFA: PFA451HP-J manufactured by Du Pont-Mitsui Fluorochemicals Co., Ltd.) 79.04 parts by mass was changed to tetrafluoroethylene-hexafluoropropylene copolymer (FEP: FEP100-J manufactured by Du Pont-Mitsui Fluorochemicals Co., Ltd.). The measurement results are shown in Table 1.

Comparative Example 1

The sample was prepared with fluororesin used in Example 1: tetrafluoroethylene-fluoroalkylvinylether copolymer (PFA: PFA451HP-J manufactured by Du Pont-Mitsui Fluorochemicals Co., Ltd.) alone, and the measurement of charge attenuation were carried out. The measurement results are shown in Table 1.

Comparative Example 2

The preparation of the sample and the measurement of charge attenuation were carried out in the same manner as in Example 1, except that fluororesin: tetrafluoroethylene-fluoroalkylvinylether copolymer (PFA: PFA451HP-J manufactured by Du Pont-Mitsui Fluorochemicals Co., Ltd.) 79.04 parts by mass, terpolymer: DAI-EL G902 (manufactured by Daikin Industries, Ltd.) 0.8 parts by mass, and ionic liquid: 1-ethyl-3-methylimidazolium-bis(trifluoromethylsulfonyl)imide 0.16 parts by mass were used. The measurement results are shown in Table 1.

Comparative Example 3

The preparation of the sample and the measurement of charge attenuation were carried out in the same manner as in Example 1, except that fluororesin: tetrafluoroethylene-fluoroalkylvinylether copolymer (PFA: PFA451HP-J manufactured by Du Pont-Mitsui Fluorochemicals Co., Ltd.) 79.04 parts by mass, terpolymer: Dyneon THV221AZ (manufactured by 3M-Sumitomo Co., Ltd.) 0.8 parts by mass, and ionic liquid: 1-ethyl-3-methylimidazolium-bis(trifluoromethylsulfonyl)imide 0.16 parts by mass were used. The measurement results are shown in Table 1.

Comparative Example 4

The preparation of the sample and the measurement of charge attenuation were carried out in the same manner as in Example 1, except that fluororesin: tetrafluoroethylene-fluoroalkylvinylether copolymer (PFA: PFA451HP-J manufactured by Du Pont-Mitsui Fluorochemicals Co., Ltd.) 79.04 parts by mass, terpolymer: Dyneon THV610GZ (manufactured by 3M-Sumitomo Co., Ltd.) 0.8 parts by mass, and ionic liquid: 1-ethyl-3-methylimidazolium-bis(trifluoromethylsulfonyl)imide 0.16 parts by mass were used. The measurement results are shown in Table 1.

Comparative Example 5

The preparation of the sample and the measurement of charge attenuation were carried out in the same manner as in Example 1, except that fluororesin: tetrafluoroethylene-fluoroalkylvinylether copolymer (PFA: PFA451HP-J manufactured by Du Pont-Mitsui Fluorochemicals Co., Ltd.) 79.04 parts by mass, terpolymer: Dyneon THVX815G (manufactured by 3M-Sumitomo Co., Ltd.) 0.8 parts by mass, and ionic liquid: 1-ethyl-3-methylimidazolium-bis(trifluoromethylsulfonyl)imide 0.16 parts by mass were used. The measurement results are shown in Table 1.

Comparative Example 6

The preparation of the sample and the measurement of charge attenuation were carried out in the same manner as in Example 1, except that fluororesin: tetrafluoroethylene-fluoroalkylvinylether copolymer (PFA: PFA451HP-J manufactured by Du Pont-Mitsui Fluorochemicals Co., Ltd.) 79.04 parts by mass, DAI-EL G902 (manufactured by Daikin Industries, Ltd.) 0.4 parts by mass, Dyneon THV221AZ (manufactured by 3M-Sumitomo Co., Ltd.) 0.4 parts by mass, and ionic liquid: 1-ethyl-3-methylimidazolium-bis(trifluoromethylsulfonyl)imide 0.16 parts by mass were used. The measurement results are shown in Table 1.

Comparative Example 7

The preparation of the sample and the measurement of charge attenuation were carried out in the same manner as in Example 1, except that fluororesin: tetrafluoroethylene-fluoroalkylvinylether copolymer (PFA: PFA451HP-J manufactured by Du Pont-Mitsui Fluorochemicals Co., Ltd.) 79.04 parts by mass, Dyneon 610GZ (manufactured by 3M-Sumitomo Co., Ltd.) 0.4 parts by mass, Dyneon THVX815GZ (manufactured by 3M-Sumitomo Co., Ltd.) 0.4 parts by mass, and ionic liquid: 1-ethyl-3-methylimidazolium-bis(trifluoromethylsulfonyl)imide 0.16 parts by mass were used. The measurement results are shown in Table 1.

Comparative Example 8

The preparation of the sample and the measurement of charge attenuation were carried out in the same manner as in Example 1, except that fluororesin: tetrafluoroethylene-fluoroalkylvinylether copolymer (PFA: PFA451HP-J manufactured by Du Pont-Mitsui Fluorochemicals Co., Ltd.) 79.04 parts by mass, KYNAR740 (manufactured by Arkema Inc.) 0.4 parts by mass, which is a homopolymer of vinylidene fluoride, Dyneon THVX815GZ (manufactured by 3M-Sumitomo Co., Ltd.) 0.4 parts by mass, and ionic liquid: 1-ethyl-3-methylimidazolium-bis(trifluoromethylsulfonyl)imide 0.16 parts by mass were used. The measurement results are shown in Table 1.

TABLE 1

| | Fluororesin | | Elastomer A Type and | | Elastomer B Type and | | Homopolymer Type and | Ionic Liquid Type and | Charge Attenuation Evaluation Results | |
|---|---|---|---|---|---|---|---|---|---|---|
| | Type | Amount | Amount | | Amount | | Amount | Amount | Max Charging Potential (kV) | Half-Life (s) |
| Example 1 | PFA | 98.8 | G902 THV 221AZ | 0.5 | THV 610GZ THVX815GZ | 0.5 | | EMI-TFSI EMI-PFBSI | 0.2 | −2.05 | 13 |
| Example 2 | PFA | 98.8 | G902 THV 221AZ | 0.5 | THV 610GZ THVX815GZ | 0.5 | | EMI-TFSI EMI-PFBSI | 0.2 | −2.21 | 24 |
| Example 3 | PFA | 98.8 | G902 THV 221AZ | 0.5 | THV 610GZ THVX815GZ | 0.5 | | EMI-TFSI EMI-PFBSI | 0.2 | −2.28 | 10 |

TABLE 1-continued

| | Fluororesin | | Elastomer A Type and Amount | | Elastomer B Type and Amount | | Homopolymer Type and Amount | | Ionic Liquid Type and Amount | | Charge Attenuation Evaluation Results | |
|---|---|---|---|---|---|---|---|---|---|---|---|---|
| | Type | Amount | | | | | | | | | Max Charging Potential (kV) | Half-Life (s) |
| Example 4 | PFA | 98.8 | G902 THV 221AZ | 0.5 | THV 610GZ THVX815GZ | 0.5 | | | EMI-TFSI EMI-PFBSI | 0.2 | −2.17 | 16 |
| Example 5 | PFA | 98.8 | G902 THV 221AZ | 0.33 | THV 610GZ THVX815GZ | 0.67 | | | EMI-TFSI EMI-PFBSI | 0.2 | −2.10 | 15 |
| Example 6 | PFA | 98.8 | G902 THV 221AZ | 0.67 | THV 610GZ THVX815GZ | 0.33 | | | EMI-TFSI EMI-PFBSI | 0.2 | −1.97 | 17 |
| Example 7 | PFA | 99.7 | G902 THV 221AZ | 0.05 | THV 610GZ THVX815GZ | 0.05 | | | EMI-TFSI EMI-PFBSI | 0.2 | −2.69 | 24 |
| Example 8 | PFA | 99.75 | G902 THV 221AZ | 0.025 | THV 610GZ THVX815GZ | 0.025 | | | EMI-TFSI EMI-PFBSI | 0.2 | −2.72 | 38 |
| Example 9 | PFA | 89.8 | G902 THV 221AZ | 5.0 | THV 610GZ THVX815GZ | 5.0 | | | EMI-TFSI EMI-PFBSI | 0.2 | −1.90 | 10 |
| Example 10 | PFA | 98.95 | G902 THV 221AZ | 0.5 | THV 610GZ THVX815GZ | 0.5 | | | EMI-TFSI EMI-PFBSI | 0.05 | −2.19 | 10 |
| Example 11 | PFA | 98.0 | G902 THV 221AZ | 0.5 | THV 610GZ THVX815GZ | 0.5 | | | EMI-TFSI EMI-PFBSI | 1.0 | −2.04 | 8 |
| Example 12 | PFA | 98.8 | G902 THV 221AZ | 0.5 | THV 610GZ THVX815GZ | 0.5 | | | EMI-TFSI EMI-PFBSI | 0.2 | −1.19 | 1 |
| Example 13 | PFA | 98.8 | G902 THV 221AZ | 0.5 | THV 610GZ THVX815GZ | 0.5 | | | EMI-TFSI EMI-PFBSI | 0.2 | −2.30 | 19 |
| Comparative Example 1 | PFA | 100 | G902 THV 221AZ | | THV 610GZ THVX815GZ | | | | EMI-TFSI EMI-PFBSI | | −2.98 | No Attenuation |
| Comparative Example 2 | PFA | 98.8 | G902 THV 221AZ | | THV 610GZ THVX815GZ | | | | EMI-TFSI EMI-PFBSI | 0.2 | −2.41 | 100 |
| Comparative Example 3 | PFA | 98.8 | G902 THV 221AZ | 1.0 | THV 610GZ THVX815GZ | | | | EMI-TFSI EMI-PFBSI | 0.2 | −2.33 | 115 |
| Comparative Example 4 | PFA | 98.8 | G902 THV 221AZ | | THV 610GZ THVX815GZ | 1.0 | | | EMI-TFSI EMI-PFBSI | 0.2 | −2.37 | 40 |
| Comparative Example 5 | PFA | 98.8 | G902 THV 221AZ | | THV 610GZ THVX815GZ | 1.0 | | | EMI-TFSI EMI-PFBSI | 0.2 | −2.77 | 86 |
| Comparative Example 6 | PFA | 98.8 | G902 THV 221AZ | 0.5 | THV 610GZ THVX815GZ | 0.5 | | | EMI-TFSI EMI-PFBSI | 0.2 | −2.47 | 40 |
| Comparative Example 7 | PFA | 98.8 | G902 THV 221AZ | 0.5 | THV 610GZ THVX815GZ | 0.5 | | | EMI-TFSI EMI-PFBSI | 0.2 | −2.50 | 40 |
| Comparative Example 8 | PFA | 98.8 | G902 THV 221AZ | 0.5 | THV 610GZ THVX815GZ | 0.5 | KYNAR 740 | 0.5 | EMI-TFSI EMI-PFBSI | 0.2 | −2.59 | 61 |

In Table, note that elastomer A is vinylidene fluoride-tetrafluoroethylene-hexafluoropropylene terpolymer containing 30-45 mol % of vinylidene fluoride, and elastomer B is vinylidene fluoride-tetrafluoroethylene-hexafluoropropylene terpolymer containing 5-25 mol % of vinylidene fluoride.

INDUSTRIAL APPLICABILITY

The fluororesin composition of the present invention has a short half-life of charging voltage when electrified by corona discharges or friction and the like. Therefore, its use in various fields requiring a fluororesin having high antistatic properties can be expected.

What is claimed is:
1. A thermoplastic fluororesin composition comprising:
a fluororesin;
two kinds of vinylidene fluoride-tetrafluoroethylene-hexafluoropropylene terpolymers; and
an ionic liquid,
wherein the terpolymers include at least one terpolymer containing 30-45 mol % of vinylidene fluoride and at least one terpolymer containing 5-25 mol % of vinylidene fluoride, and wherein a content of the vinylidene fluoride is a value calculated by a 19F-NMR method.
2. The thermoplastic fluororesin composition according to claim 1, wherein the fluororesin is tetrafluoroethylene-perfluoroalkylvinylether copolymer or tetrafluoroethylene hexafluoropropylene copolymer.
3. The fluororesin composition according to claim 1, wherein the terpolymer containing 30-45 mol % of vinylidene fluoride and the terpolymer containing 5-25 mol % of vinylidene fluoride are contained in a total amount of 0.1% by mass to 10% by mass.
4. The fluororesin composition according to claim 1, wherein the ionic liquid has a heterocyclic ring.
5. The fluororesin composition according to claim 1, wherein the ionic liquid is contained in the amount of 0.01% by mass to 1% by mass in the fluororesin composition.

* * * * *